Sept. 22, 1931.   G. H. HUFFERD   1,824,271
END CONSTRUCTION FOR TIE RODS OR THE LIKE
Filed Dec. 19, 1925
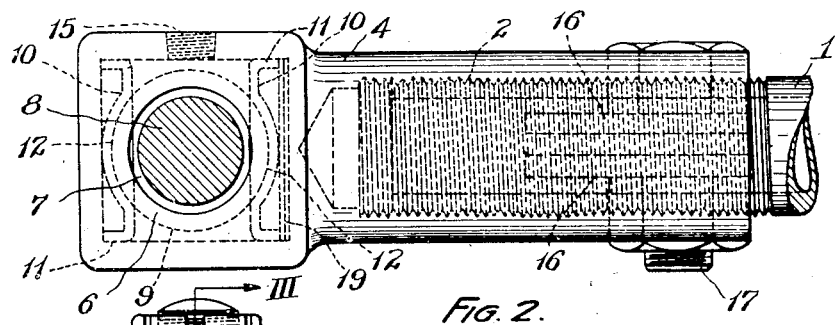
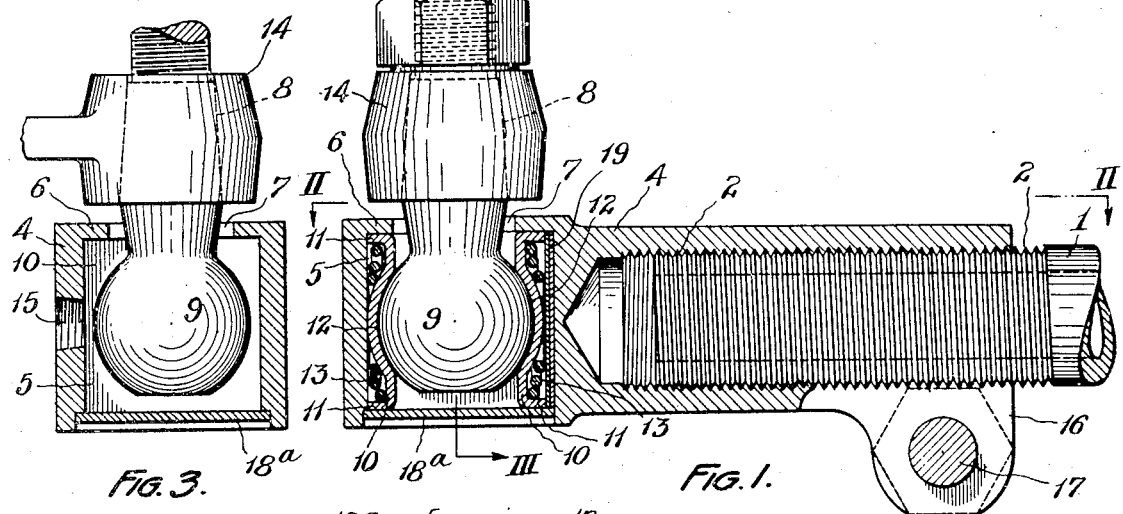
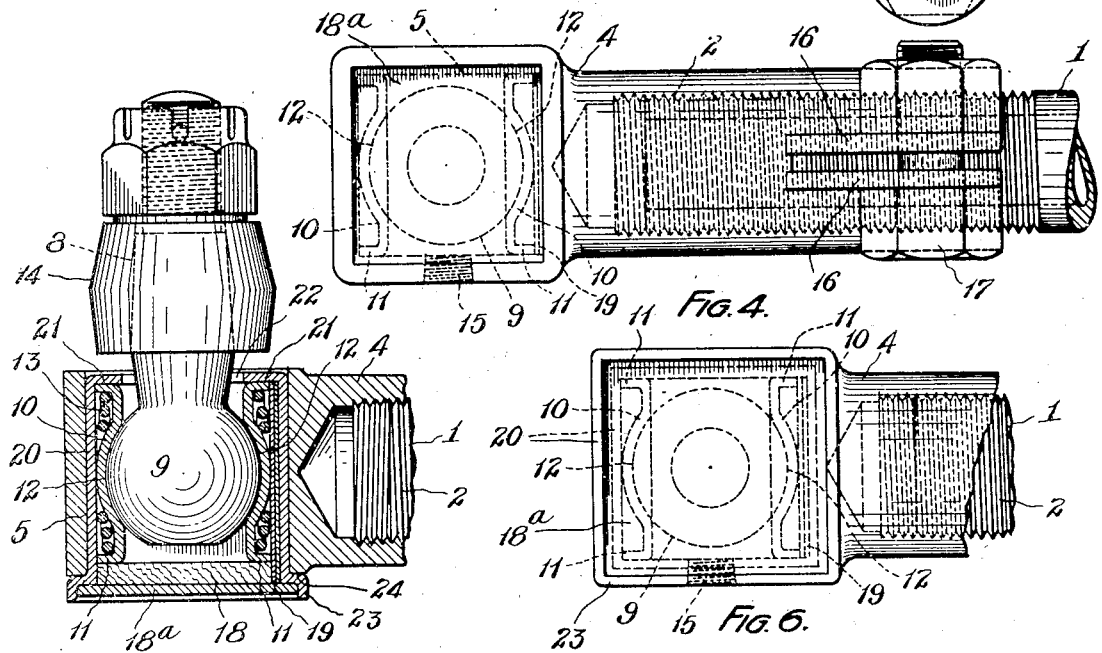
INVENTOR:
GEORGE H. HUFFERD
BY
ATTORNEY.

Patented Sept. 22, 1931

1,824,271

UNITED STATES PATENT OFFICE

GEORGE H. HUFFERD, OF DETROIT, MICHIGAN, ASSIGNOR TO THOMPSON PRODUCTS INC., OF CLEVELAND, OHIO, A CORPORATION OF OHIO

END CONSTRUCTION FOR TIE-RODS OR THE LIKE

Application filed December 19, 1925. Serial No. 73,455.

The invention relates to constructions for the ends of tie rods or connecting rods such as are used in automobiles or like situations. The tie rod or connecting rod of an automobile is that rod which connects one arm of a front steering knuckle to a like arm on the opposite side to compel turning of the front wheels when one of the steering knuckles is moved by the operation of the steering wheel. More particularly the invention relates to the tie rod end member and its method of connection with the tie rod intermediate member, and to the universal joint connected thereto.

The object of the invention is to provide a tie rod construction having a universal ball joint at its end which is safe, strong and durable, easily assembled and lubricated, cheaply manufactured, in which rattling in the joint will be prevented, and wherein the ball joint is in axial alignment with the stress imposed thereon by the tie rod.

The invention consists in the novel construction and arrangement hereinafter described and claimed. The invention is capable of embodiment in various forms and combinations, but the best form which I have thus far contemplated is shown in the annexed drawings and which I shall now describe.

Referring to the annexed drawings:

Figure 1 is a vertical longitudinal section through the tie rod end and ball joint.

Fig. 2 is a sectional plan view of Fig. 1 on the line II—II of Fig. 1;

Fig. 3 is a vertical cross sectional view on the line III—III of Fig. 1;

Fig. 4 is a bottom plan view of the construction shown in Fig. 1;

Fig. 5 is a vertical longitudinal section, corresponding to the end section of Fig. 1, showing a modified form of ball joint casing;

Fig. 6 is a bottom plan view of the construction shown in Fig. 5.

Referring to the drawings in detail, and to Figs. 1 to 4 showing the preferred form of the invention, a tie rod intermediate member 1 is provided with an externally threaded portion 2 at its end which takes into an internally threaded cavity in the end member 4. The outer end of the end member 4 is provided with a cavity 5, rectangular in cross section, open at its lower end, and partly closed at its upper end by an inwardly projecting flange 6 to form a ball joint casing. The flange 6 bounds an opening 7 of a size to admit the shank 8 of a ball stud whose ball 9 is seated in the cavity between wear resisting ball seats 10. Each of the wear resisting ball seats 10 consists of a plate, rectangular in outline, having flanges 11 at the margin and a concave central wear resisting portion 12, serving as a bearing surface for the ball 9. As above indicated the central portion of the ball seat is concavo-convex and it is so proportioned with respect to the flanges 11 that when in assembled position the flanges 11 and the outer surfaces of the central part bear upon the walls of the ball joint casing. It will be noted that the highest point of the outer surface of portion 12 is disposed in a plane common to the free ends of flanges 11. With this arrangement it is possible to provide the ball with a greater bearing surface without the necessity of increasing the overall size of the cavity in the tie rod end member 4. That is to say, by forming the concave convex portion of each seat so that its highest point is flush with the outer peripheral edge of the seat it is possible to utilize the space afforded in the cavity 5 to greater advantage as far as the bearing surface provided for the ball is concerned. Interposed between the ball seats 10 and the adjacent wall of the ball joint casing are coil springs 13 which serve to prevent rattling by taking up wear in the joint. The upper end of the shank 8 of the ball stud is adapted to enter an aperture in a member 14 to be connected to the tie rod, such as the arm of a steering knuckle. The upper end of the shank of the ball stud is provided with a threaded portion to receive suitable securing nuts.

In one side of the ball joint casing an aperture 15 is provided to permit lubrication of the joint; as shown, the aperture is internally threaded to receive the threaded end of a grease cup or other similar part.

The inner end of the end member 4 is split and from the split edges extend apertured ears 16 adapted to receive a clamping bolt 17 by means of which the end member 4 is securely clamped to the intermediate member 1.

In assembling the ball joint in the ball joint casing the ball seats are engaged with the ball, and while so held the shank of the ball stud is passed upwardly through the opening 7 in the ball joint casing until the upper flanges 11 of the ball seats engage the shoulders formed by the inwardly projecting flanges 6 on the ball joint casing, after which the lower end of the opening is sealed by any suitable means, such as a plug 18ª.

In case there is wear in the ball joint which cannot effectively be taken up by the antirattling springs 13, the construction is such that shims 19 may be interposed between the ball seats and the adjacent wall of the ball joint casing.

Instead of providing for limiting the upward movement of the ball stud by means of the integral inwardly projecting flanges 6 as shown in Fig. 1, these flanges may be omitted as indicated in Fig. 5, in which case the aperture in the outer end of the end member will be of the same dimensions throughout. In this case it is necessary to provide other means to prevent the ball stud from being drawn from the upper end of the ball joint casing. This is accomplished by providing a ball joint casing 20 of a cross section to snugly fit within the aperture in the end member. The ball joint casing 20 is provided at its upper end with an integral inwardly projecting flange 21 thus providing an opening 22 through which the shank of the ball stud extends. At its lower end the ball joint casing is provided with an outwardly and downwardly projecting flange 23, and the end is closed by a felt pad 18 and a welch plug 18ª. The outwardly projecting portion of the flange forms a shoulder 24 which engages the surface of the end member adjacent the lower end of the opening therein. Except for this ball joint casing just described the structure is the same as the structure illustrated in Figs. 1 to 4.

As above indicated the stress upon the parts tends to draw the ball stud out of the casing; it will be obvious that in the construction just described, this tendency will be effectively prevented because the shoulder 24 at the lower end of the ball joint casing engages the end member, and the upper flange 21 engages the ball seats to prevent their escape from the casing.

The advantages of the polygonal or rectangular cavity 5 are that it permits of the use of simple and inexpensive ball seats or bearings 10, such as metal stampings, and in that it enables the ball seats 10 to be positioned in alignment with the forces present or in other words the stresses acting on the ball 9 in the direction of the length of the tie rod. Then, too, this arrangement permits of the use of shims 19 to take up any play or wear and tear in the joint.

From the above description it will be seen that I have provided a construction which effectively attains the objects above stated. While I have described specific details of the best forms of the invention now known to me, it is obvious that the parts may be varied greatly in structure and that different features thereof may be used with other features which may differ greatly from those shown. It is therefore to be understood that the invention includes all structures comprehended within the terms of the appended claims.

What I claim is:

1. In combination, in a universal joint, a ball casing comprising a tubular member having a polygonal-shaped cavity, ball seating means disposed in said cavity and shaped to conform with the polygonal contour of said cavity, a ball stud having its shank extending into said cavity and having its ball in cooperation with said seating means, and a closure for said casing disposed at substantially right angles to said seating means and directly opposite said ball.

2. In combination, in a universal joint, a ball casing comprising a tubular member having a polygonal-shaped cavity, ball seating means disposed in said cavity and shaped to conform with the polygonal contour of said cavity, a ball stud having its shank extending into said cavity and having its ball in cooperation with said seating means, a closure for said casing disposed at substantially right angles to said seating means and directly opposite said ball, and resilient means between the walls defining said cavity and said ball seating means for urging said means in a direction at substantially right angles to the axis of said stud into cooperation with said ball.

3. In combination, in a universal joint, a ball casing comprising a tubular member having a polygonal-shaped cavity, ball seating means disposed in said cavity and shaped to conform with the polygonal contour of said cavity, a ball stud having its shank extending into said cavity and having its ball in cooperation with said seating means, a closure for said casing disposed at substantially right angles to said seating means and directly opposite said ball, and resilient means between the walls defining said cavity and said ball seating means for urging said means into cooperating with said ball, said resilient means exerting a force upon said ball at substantially right angles to the axis of said ball stud.

4. As an article of manufacture, a casing for a ball joint coupling comprising a tubular member of polygonal cross-section having an inwardly extending flange at one end formed to cooperate with a ball stud, and an outwardly extending flange at its other end formed to cooperate with a tie rod end member.

Signed by me this 25th day of November, 1925.

GEORGE H. HUFFERD.